United States Patent
McPhee et al.

(10) Patent No.: US 7,117,060 B2
(45) Date of Patent: Oct. 3, 2006

(54) METHOD OF IMPROVING PRODUCTION THROUGH COST OF YIELD MEASUREMENT

(75) Inventors: Thomas A. McPhee, Hopewell Junction, NY (US); Michael E. Cropp, LaGrangeville, NY (US); Donald Diangelo, Fishkill, NY (US); Alberto H. Gay, Aguadilla, PR (US); Carmella Pemberton, Wappingers Falls, NY (US); Joseph Saltarelli, Pleasant Valley, NY (US); Nicholas L. Volkringer, Southbury, CT (US); John J. DeMarco, Marlboro, NY (US)

(73) Assignee: International Business Machines Corporation, Armonk, NY (US)

( * ) Notice: Subject to any disclaimer, the term of this patent is extended or adjusted under 35 U.S.C. 154(b) by 1191 days.

(21) Appl. No.: 09/770,355

(22) Filed: Jan. 26, 2001

(65) Prior Publication Data

US 2002/0103560 A1    Aug. 1, 2002

(51) Int. Cl.
    *G06F 19/00*    (2006.01)
(52) U.S. Cl. .................. 700/110; 700/109; 700/110; 700/121; 705/400
(58) Field of Classification Search ............. 700/108, 700/109, 110, 121; 705/400
    See application file for complete search history.

(56) References Cited

U.S. PATENT DOCUMENTS

| | | | |
|---|---|---|---|
| 5,047,947 A | 9/1991 | Stump | |
| 5,077,661 A | 12/1991 | Jain et al. | |
| 5,249,120 A | 9/1993 | Foley | |
| 5,291,397 A | 3/1994 | Powell | |
| 5,351,195 A | 9/1994 | Sherman | |
| 5,715,181 A | 2/1998 | Horst | |
| 5,946,661 A * | 8/1999 | Rothschild et al. | ......... 700/108 |
| 5,966,694 A | 10/1999 | Rothschild et al. | |

OTHER PUBLICATIONS

"Cost of Yield Process Center Dependence is Key." Example.
"Process Center Definition." Example.

* cited by examiner

Primary Examiner—Leo Picard
Assistant Examiner—Charles Kasenge
(74) Attorney, Agent, or Firm—DeLio & Peterson LLC; Robert Curcio; Jay H. Anderson

(57) ABSTRACT

The present invention provides a method for controlling production or manufacturing costs by obtaining yield measurements of unit manufacturing for a multiplicity of products or production lines having a plurality of processes which includes determining a started units number for the plurality of processes. The method further includes determining a cost per unit for each unit of the plurality of processes, and calculating an expected approved units number for the plurality of processes. The expected approved units number is calculated by multiplying the started units number by an expected yield measurement. The method next includes calculating an actual approved units number for each of the plurality of processes by multiplying the started units number by an actual yield measurement, and calculating an unapproved units number for each of the plurality of processes by subtracting the expected approved units number from the actual approved units number. The method then includes calculating cost of yield measurements for the plurality of processes by multiplying the unapproved units number by the cost per unit, and providing a comparison of the cost of yield measurements for the plurality of processes.

21 Claims, 5 Drawing Sheets

| | A | B | C | D | E | F | G | H |
|---|---|---|---|---|---|---|---|---|
| | REPORT CLASS 9211 PRODS | PRODUCT | PI COST | PII COST | PIII COST | PIV COST | PV COST | TOTAL COST |
| | | LASERSX | 3648 | 9851 | 5089 | -1437 | -1703 | 15448 |
| | | COMET 2 | 1532 | 684 | 9476 | -934 | -3761 | 6996 |
| | | BOXER 215 | 5502 | 71 | 83 | -292 | -279 | 5085 |
| | | LEXINGTON B | 951 | 1549 | 3035 | -565 | -233 | 4737 |
| | | ONYX | 1374 | 5091 | -560 | -1755 | -179 | 3971 |
| | | TERRIER | -2181 | 841 | 8851 | -2248 | -1501 | 3762 |
| | | LASSIE | 0 | 375 | 3488 | -274 | -286 | 3302 |
| | | LASERS | -585 | 2872 | 6437 | -2679 | -3431 | 2615 |
| | | REDFOX | 0 | 0 | 2836 | -253 | -9 | 2573 |
| | | A1442S | 0 | 0 | 2769 | -374 | -82 | 2313 |
| | | MARS | 909 | 165 | 1116 | -276 | 158 | 2072 |
| | | SHEPARD | -207 | 0 | 4162 | -1434 | -524 | 1998 |
| | | M14-42 | 216 | 746 | 996 | -112 | -28 | 1818 |
| | | REDBOAT | 1597 | 0 | 0 | 0 | 0 | 1597 |
| | | A1232S | 958 | 376 | 319 | -64 | -32 | 1558 |
| | | ESCONLCX 215 | 452 | 291 | 795 | -191 | -106 | 1241 |
| | | PENTA S5/21 | 1258 | -75 | 45 | 11 | 0 | 1240 |
| | | GUS | 0 | 1172 | 0 | 61 | 0 | 1234 |
| | | STINGERX | 1555 | -281 | 0 | -121 | 0 | 1216 |
| | | LAB | 0 | -76 | 1277 | -61 | 47 | 1187 |
| | | CACTUSX | 893 | 231 | 175 | -106 | -11 | 1183 |
| | | COLLIE | -363 | -993 | 2748 | -214 | 0 | 1179 |
| | | MAGPIE C | 0 | 998 | 21 | 70 | -138 | 951 |
| | | BRIDGE | 921 | 122 | 86 | -183 | 0 | 946 |
| | | PENTA E9/25 | 230 | -38 | 871 | -134 | -18 | 912 |
| | | HOMER | 0 | 0 | 159 | -234 | 674 | 599 |
| | | M7-25 | 381 | -105 | 354 | -19 | -22 | 589 |
| | | MOUND | 0 | 0 | 505 | -5 | 62 | 573 |
| | | PENTA E3/21 | 139 | 66 | 435 | -51 | -18 | 571 |
| | | LAREDO2 | 143 | -22 | 249 | -22 | -23 | 325 |
| | | HUSKIE | 380 | -1 | 3 | -25 | -44 | 313 |
| | | PENTA S8/25 | 41 | -22 | 347 | -66 | -6 | 293 |
| | | PAN | 0 | -24 | 463 | -95 | -58 | 286 |
| | | GOLDEN | 326 | -248 | 1383 | -1171 | -47 | 244 |
| | | PENTA S10 | 383 | -110 | 0 | 0 | -49 | 224 |
| | | PENTA E6/25 | 212 | 0 | 0 | 0 | 0 | 212 |
| | | S7/25 | 200 | 0 | 0 | 0 | 0 | 200 |
| | | CUDA215 | 266 | 744 | 2716 | -1905 | -1653 | 168 |
| | | SEASTAR 2 | 125 | 0 | 0 | 0 | 0 | 125 |
| | | M16-42 | 126 | 69 | -31 | -71 | 19 | 113 |
| | | DIANA | 0 | 111 | 19 | -8 | -20 | 101 |
| | | JAZZ | 0 | 0 | 112 | -7 | -12 | 93 |
| | | RIOS 32MM | -85 | -52 | 374 | -72 | -75 | 90 |
| | | ABARIS | 65 | 0 | 0 | 0 | -2 | 62 |
| | | JUNO/JUPITER | 0 | 0 | -28 | -36 | 111 | 47 |
| | | ADONIS | 0 | 45 | 0 | 0 | 0 | 45 |
| | | MUFASA | 38 | 0 | 0 | 0 | 0 | 38 |
| | | HOUNDX | -303 | 165 | 402 | -87 | -152 | 26 |
| | | CELTIC | 0 | 0 | 0 | 9 | 7 | 16 |
| | | NALA | 204 | 34 | -100 | -62 | -63 | 13 |
| | | TITAN | 0 | -16 | 100 | -26 | -49 | 9 |
| | | PENTA S9/25 | -1 | -24 | 59 | -23 | -3 | 8 |
| | | RHINO | 0 | -10 | 17 | 0 | 0 | 8 |
| | | STOKER | 0 | 0 | 0 | 0 | 0 | 0 |
| | | CHARLEVOIX | 0 | 0 | 0 | 0 | 0 | 0 |

FIG. 4

METHOD OF IMPROVING PRODUCTION THROUGH COST OF YIELD MEASUREMENT

BACKGROUND OF THE INVENTION

1. Field of the Invention

This invention relates generally to a method for controlling and improving production or manufacturing processes using production data and calculation of specific variables to provide meaningful measurements for the production processes and, in particular, to a method for calculating cost of yield measurements for a multiplicity of production and manufacturing processes.

2. Description of Related Art

One goal of a manufacturing plant is to produce goods (or services) at a low enough cost to allow the company to make a sufficient profit selling them. One measurement frequently used to track the performance of the manufacturing plant is product yield. The yield is defined as the number of good parts or units shipped from the plant, divided by the number of parts or units started. Each product in a factory will routinely have a target yield which, if met, ensures that the company's cost targets are met. Traditionally, if the actual yield of a product falls below the target yield established for it, resources will be applied to correct whatever problem is lowering the yields. The resources (which are typically limited) may include, for example, manufacturing engineering analysis, equipment improvements, or new equipment, all of which, and others, that have monetary value.

In a large factory with many products running simultaneously, multiple products will be below their yield targets by varying amounts. However, applying limited resources to the products farthest behind their targets may not be the most efficient way to allocate them because other factors, such as, unit cost are not considered.

In a typical manufacturing plant having many products being processed or manufactured, the manufacturing process generally begins with a quantity of pieces to be processed. However, typically, after processing, a quantity of the pieces are not fit to be sold, or do not meet quality standards. This results in a loss of parts each time the process is run. Further, the process may or may not meet expected yields based on the number of pieces started and the number of post process pieces passing inspection or pieces which are shippable.

Thus, each product will have an expected number of parts to be shipped, which will be somewhat less than the number of parts started. The ratio of the number of parts shipped to the number of parts started is the actual yield. A plant will have an expected value for this yield (known as the "expected yield" or the "plan yield"). In a best case scenario, the actual yields are at or above their expected (or plan) values, and the plant is producing what is expected, and is profitable. However, in a typical manufacturing environment, expected yields are high and many products may not attain the expectations. The plant must apply it's limited resources (i.e., manpower, purchasing, research) to resolve whatever problems are preventing the products from achieving their expected yield.

A common difficulty related to the expected yield and the lack of meeting expected yields is that there are not enough resources to solve all the plant's problems simultaneously. A series of problems and decision may have to be resolved, such as, which problem to address first, how much time and money to expend on each problem for each process, and the extent of research investment.

Previous methods disclosed in the prior art prioritizes problems by addressing the product with the greatest difference between actual yield and expected yield. If all products are the same, then selecting the one that is the farthest off the plan could be a reasonable way to allocate scarce resources. However, products can vary in a multitude of ways, such as, for example, their cost of material, sale price, cost of manufacture, etc. Therefore, a plurality of factors need to be taken into account when prioritizing product manufacturing. For example, a single comparison, such as actual yield vs. expected yield, may show that a first product has a lower yield than a second product. However, the second product may cost much more to manufacture then the first product. Thus, it may actually be more cost efficient to spend resources on the second, higher yield, product.

Bearing in mind the problems and deficiencies of the prior art, it is therefore an object of the present invention to provide a method for controlling manufacturing costs by calculating and comparing significant data to determine which manufacturing processes should receive resources for enhancement.

It is another object of the present invention to provide a method for ascertaining costs of manufacturing processes which is straightforward in application.

A further object of the invention is to provide a method for calculating measurements of performance of multiple processes.

It is yet another object of the present invention to provide a method which compares a plurality of measurements of performance of multiple processes.

It is yet another object of the present invention to provide a method for calculating measurements of value of production processes and provide meaningful data for allocating production resources.

Still other objects and advantages of the invention will in part be obvious and will in part be apparent from the specification.

SUMMARY OF THE INVENTION

The above and other objects and advantages, which will be apparent to one of skill in the art, are achieved in the present invention which is directed to, in a first aspect, a method for controlling production or manufacturing costs by obtaining measurements of unit manufacturing for a multiplicity of products or production lines and having a started units number for a plurality of processes, which includes determining an approved units number for the plurality of processes. The method further includes determining a unit production cost for each unit in the plurality of processes, calculating an unapproved units number for each process, calculating a cost of yield measurement for each of the plurality of processes by multiplying the unapproved units number by the unit production cost for each unit; and comparing the cost for each unapproved unit for each process.

In a related aspect, the present invention includes providing an expected yield measurement for each of the plurality of processes, calculating an expected approved units number by multiplying the started units number by the expected yield measurement, calculating an actual yield for each of the plurality of processes, and providing a comparison of the cost of yield with the actual yield for each plurality of processes.

In another aspect, the present invention provides a method for controlling production or manufacturing costs by obtaining yield measurements of unit manufacturing for a multiplicity of products or production lines having a plurality of processes which includes determining a started units number for the plurality of processes. The method further includes determining a cost per unit for each unit of the plurality of processes, calculating an expected approved units number for the plurality of processes by multiplying the started units number by an expected yield measurement, calculating an actual approved units number for each of the plurality of processes by multiplying the started units number by an actual yield measurement, calculating an unapproved units number for each of the plurality of processes by subtracting the expected approved units number from the actual approved units number, calculating cost of yield measurements for the plurality of processes by multiplying the unapproved units number by the cost per unit, and providing a comparison of the cost of yield measurements for the plurality of processes.

In a related aspect, the present invention provides calculating an actual yield measurement by dividing an initial approved units number by the started units number for each of the plurality of processes, and providing a comparison of the actual yield measurement for the plurality of processes. Calculating an expected yield measurement by dividing an initial expected approved units number by the started units number for each of the plurality of processes, and providing a comparison of the expected yield measurement for the plurality of processes.

In yet another aspect, the present invention provides a method for controlling and improving production or manufacturing costs by obtaining yield measurements of unit manufacturing for a multiplicity of products or production lines having a plurality of processes, which includes determining an initial started units number for the plurality of processes. The method further includes determining a cost per unit number for each unit of the plurality of processes, calculating an actual yield measurement by dividing an initial approved units number by the initial started units number for each of the plurality of processes, providing a comparison of the actual yield measurement for the plurality of processes, and calculating expected yield measurements by dividing an expected approved units number by the initial started units number for each of the plurality of processes. The method also includes providing a comparison of the expected yield measurements for the plurality of processes, calculating an initial actual approved units number for the plurality of processes by multiplying a subsequent started units number by the actual yield measurement, and calculating subsequent expected approved units numbers for the plurality of processes by multiplying the subsequent started units numbers by the expected yield measurement. The method further includes, calculating cost of yield measurements for the plurality of processes by multiplying the subsequent expected approved units number by the cost per unit, and providing a comparison of the cost of yield measurements for a plurality of processes.

In a related aspect, the present invention provides calculating a subsequent actual unapproved units number for a plurality of processes by subtracting the subsequent expected approved units number from a subsequent actual approved units number.

In a related aspect, the present invention provides yields that are recalculated with subsequent data and tabulated for comparing the yields.

In another related aspect, the present invention provides a plurality of processes run simultaneously.

In yet another related aspect, the present invention provides applying resources to the processes having the highest cost of yield based on the comparing of the costs of yield measurements.

In yet another aspect, the present invention provides a method for controlling production or manufacturing costs by obtaining and comparing measurements of unit manufacturing costs for production or manufacturing of a plurality of products or production lines determining a started units number for each of a plurality of processes, determining an approved units number for each of the plurality of processes, determining a unit production cost for each unit of each process, and calculating an unapproved units number by subtracting the units started number from the approved units number. The method further provides calculating cost of yield measurement for each of the plurality of processes by multiplying the unapproved units number by the unit production cost for each of the plurality of processes, and providing a comparison of the cost of yield measurement for each of the plurality of processes.

In a related aspect, the present invention provides calculating an actual yield measurement by dividing the approved units number by the started units number for each of the plurality of processes, and providing a comparison of the actual yield measurement of each of the plurality of processes.

In another related aspect, the present invention provides calculating a target yield measurement, and providing a comparison of the target yield measurement for each of the plurality of processes.

In yet another related aspect, the present invention provides calculating a target yield measurement, and providing a comparison of the target yield measurement for each of the plurality of processes.

In still another related aspect, the present invention provides the plurality of processes run simultaneously.

In another related aspect, the present invention provides applying resources to the processes having the highest cost of yield based on the comparing of the costs of yield measurements.

In still another aspect, the present invention provides a method for controlling and improving production or manufacturing costs by obtaining and comparing yield measurements of unit manufacturing for a plurality of products or production lines which includes determining a started units number for each of a plurality of processes, determining an approved units number for each of the plurality of processes, determining a unit production cost for each unit of each process, and calculating an actual yield measurement by dividing the approved units number by the started units number for each of the plurality of processes. The method further includes providing a comparison of the actual yield measurements for each of the plurality of processes, calculating a number of unapproved units by subtracting the started units number from the approved units number, calculating cost of yield measurement for each of the plurality of processes by multiplying the number of unapproved units by the unit production cost for each unit, and providing a comparison of the cost of yield measurement for each of the plurality of processes.

In another related aspect, the present invention provides calculating an expected approved units number by multiplying the started units number by an expected yield measurement, and calculating the approved units number by multiplying the started units number by the actual yield measurement.

In yet another related aspect, the present invention provides calculating an expected yield measurement by dividing the expected approved units number by the started units number, and providing a comparison of the expected yield measurements for each of the plurality of processes.

In yet another related aspect, the present invention provides determining a sale cost of each unit of each process, calculating cost of lost sales for each of the plurality of processes by multiplying the number of unapproved units by the sale cost for each unit, and providing a comparison of the cost of lost sales for each of the plurality of processes.

In still another aspect, the present invention provides a computer program product for controlling production or manufacturing costs by obtaining measurements of unit manufacturing for a multiplicity of products or production lines and having a started units number for a plurality of processes, which includes computer readable program code means for determining an approved units number for the plurality of processes, and computer readable program code means for determining a unit production cost for each unit in the plurality of processes. The computer program further includes computer readable program code means for calculating an unapproved units number for process, computer readable program code means for calculating a cost of yield measurement for each of the plurality of processes by multiplying the unapproved units number by the unit production cost for each unit, and computer readable program code means for comparing the cost for each unapproved unit for each the process.

In another aspect, the present invention provides a program storage device readable by a machine, tangibly embodying a program of instructions executable by the machine to perform steps for controlling production or manufacturing costs by obtaining measurements of unit manufacturing for a multiplicity of products or production lines and having a started units number for a plurality of which includes determining an approved units number for the plurality of processes, and determining a unit production cost for each unit in the plurality of processes. The program storage device further includes calculating an unapproved units number for each process, calculating a cost of yield measurement for each of the plurality of processes by multiplying the unapproved units number by the unit production cost for the each unit, and comparing the cost for each unapproved unit for each process.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIG. 4 is a sample chart of product output data using the preferred embodiment of the present invention.

DESCRIPTION OF THE PREFERRED EMBODIMENT(S)

Figure 1:
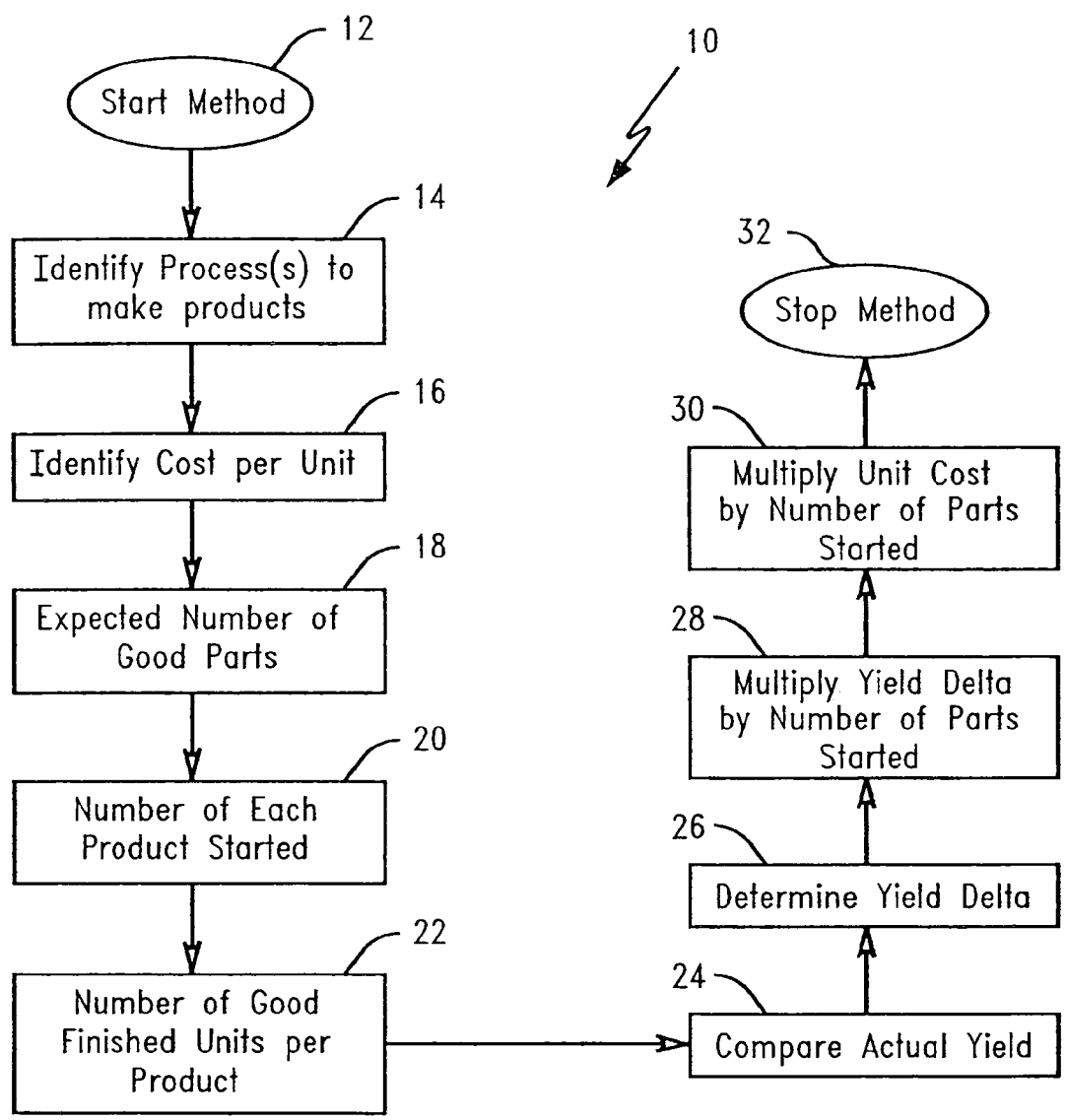
FIG. 1 is a flow chart showing the general steps of a preferred embodiment of the present invention.

In describing the preferred embodiment of the present invention, reference will be made herein to FIGS. 1–5 of the drawings in which like numerals or letters refer to like features of the invention. Features of the invention are not necessarily shown to scale in the drawings.

The present invention as disclosed herein has advantages over previous methods disclosed in the prior art and discussed above. The present invention takes into account that all products are not the same, but, differ in many ways by computing a cost to manufacture each piece or product, and applying this to a yield delta. A dollar value can be assigned to each product that is below or above its expected yield and resources assigned to improve manufacturing processes using the "cost of yield" measurement. Assigning resource in this way provides better allocation of scarce resources to solve production problems.

Referring to FIG. 1, a flow chart 10 generally describing the steps of a preferred embodiment of the present invention is shown. The method is started 12 by identifying the process or processes used to make each of a plurality of products 14. Then, identify the incremental cost added to each product by each process identifying the cost per unit of the product produced 16. Next, identify the expected number of good parts 18 generated for a given number of started parts for each process of each product. This number is the "expected yield" for each product through each process. Then, identify the quantity of each product started in a given time period (e.g. Daily, Weekly, Month to Date, etc.) in each process for that particular product 20. Next, identify the quantity of goods or approved finished units of each product in each process in the same time period 22. Then, compute the actual yield of each product in each process by dividing the number of good or approved finished units by the total number of units started 24. After that, determine the "Yield Delta" by subtracting the actual yield for each product in each process from the expected yield for each product in each process 26.

Next, multiply the "Yield Delta" by the number of parts started for each product for each process 28. This represents the number of additional parts that would have to be started to get the expected number of good parts out of each process, for each product. This assumes that the actual yield is below the expected one. If the actual yield is above the expected yield, this number is negative, and represents the number of extra good parts finished above the number expected.

Subsequently, multiply the unit costs (16) by the result of multiplying the yield data by the number of parts started for each product and process (28). The result is a dollar value representing the "Cost of Yield" for each process step for each product. This information can be used to effectively prioritize which products in which process steps are impacting the plant the most, and which should be addressed first.

The "Cost of Yield" measurement includes the cost of the product as well as the quantity approved or determined to be good. Thus, a conversion of a straightforward yield delta measurement to a cost in dollars is employed using the preferred embodiment of the present invention. The ability to compute a dollar cost, which can then be compared across all products, is one of the advantages of the present invention.

In operation, the preferred embodiment for this invention includes a software program running on a computer system with the following characteristics. The computer collects yield information on all products for all processes in the factory on a "regular" basis. A "regular" basis is frequently enough to take action against any new problems found, for example, daily, so that the computer system updates information recording the parts started, and approved parts once a day. Also, it is possible to have "real time" measurements, and more frequent reports if desired.

The computer contains a relational database, or access to a relational database. This database holds all the collected yield information as well as the unit costs of each product for each process it sees, and the expected yield for each product in each process. The relational database can be queried to retrieve specific data as required to compute the cost of yield.

The present invention is a method for efficiently applying limited resources to solve production problems in an environment where many products are manufactured simultaneously. This invention factors in the out of pocket cost of having a difference between actual yield and target yield. This out of pocket cost includes the materials and labor required to manufacture more (or fewer) parts because of the lower (or higher) than target yield. The calculations include:

Number of parts started*target yield=number of parts expected to be shipped.

Number of parts started*actual yield=number of parts actually shipped

Number of parts actually shipped−number of parts expected to be shipped=quantity of parts lost due to yield.

Quantity of parts lost due to yield*out of pocket cost per part="COST OF YIELD".

Performing the calculation to measure "Cost of Yield" across all the products in the manufacturing plant will show which products are costing (or saving) the company the most money. Limited resources are then allocated to work on the products costing the company the most money.

An advantage of the present invention is in providing a method for applying limited resources to solve production problems by clearly identifying which products are costing a company the most money to produce at less than their target yield. The present invention can be implemented using computer programs which generate daily reports for every product in the factory. The reports show the computation of how much money each is costing (or saving) the company because of differences between actual and target yield. Engineering support is assigned to work on products based on how much money is being lost by running the product below target yield.

Figure 2:
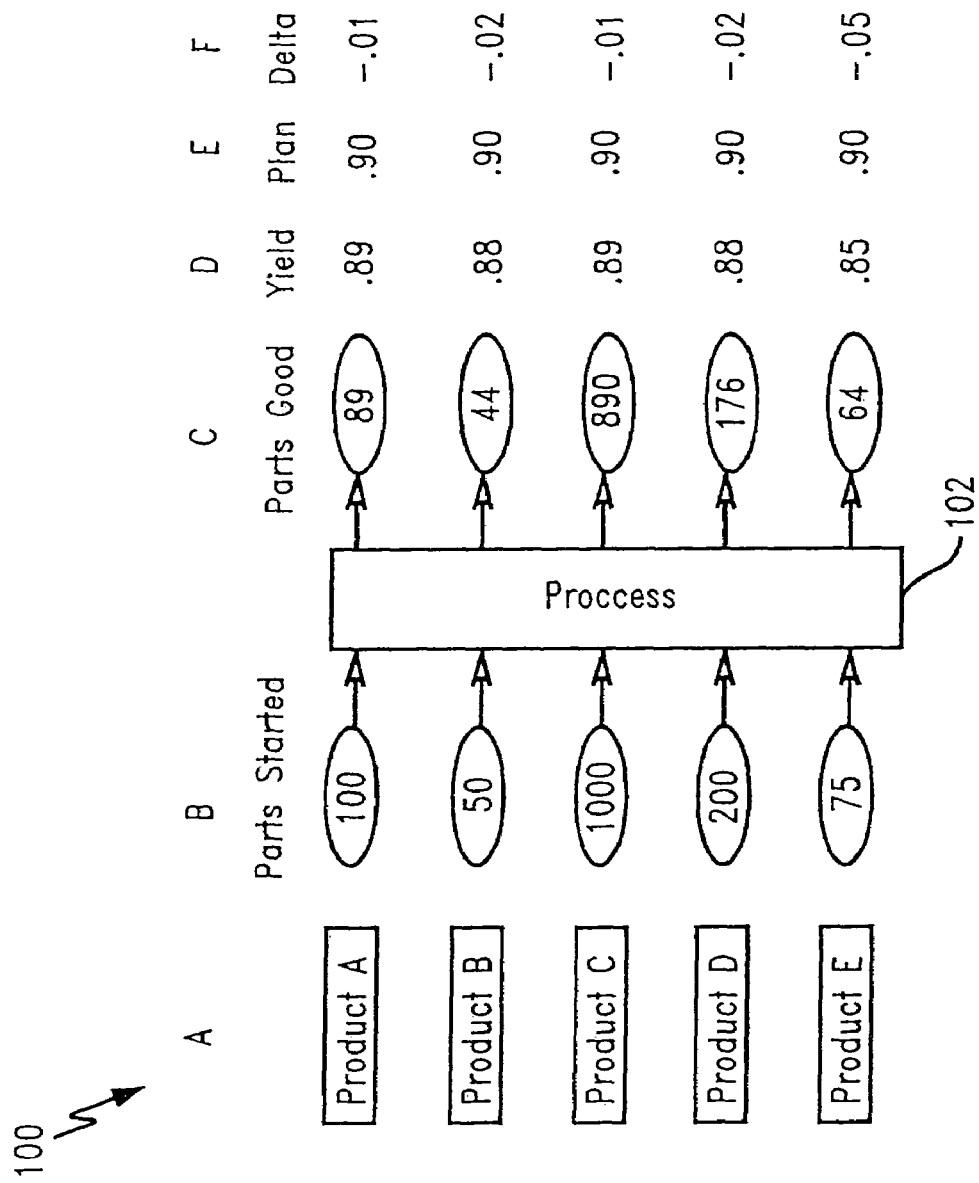
FIG. 2 is a sample yield management chart without cost of yield measurements.
Figure 3:
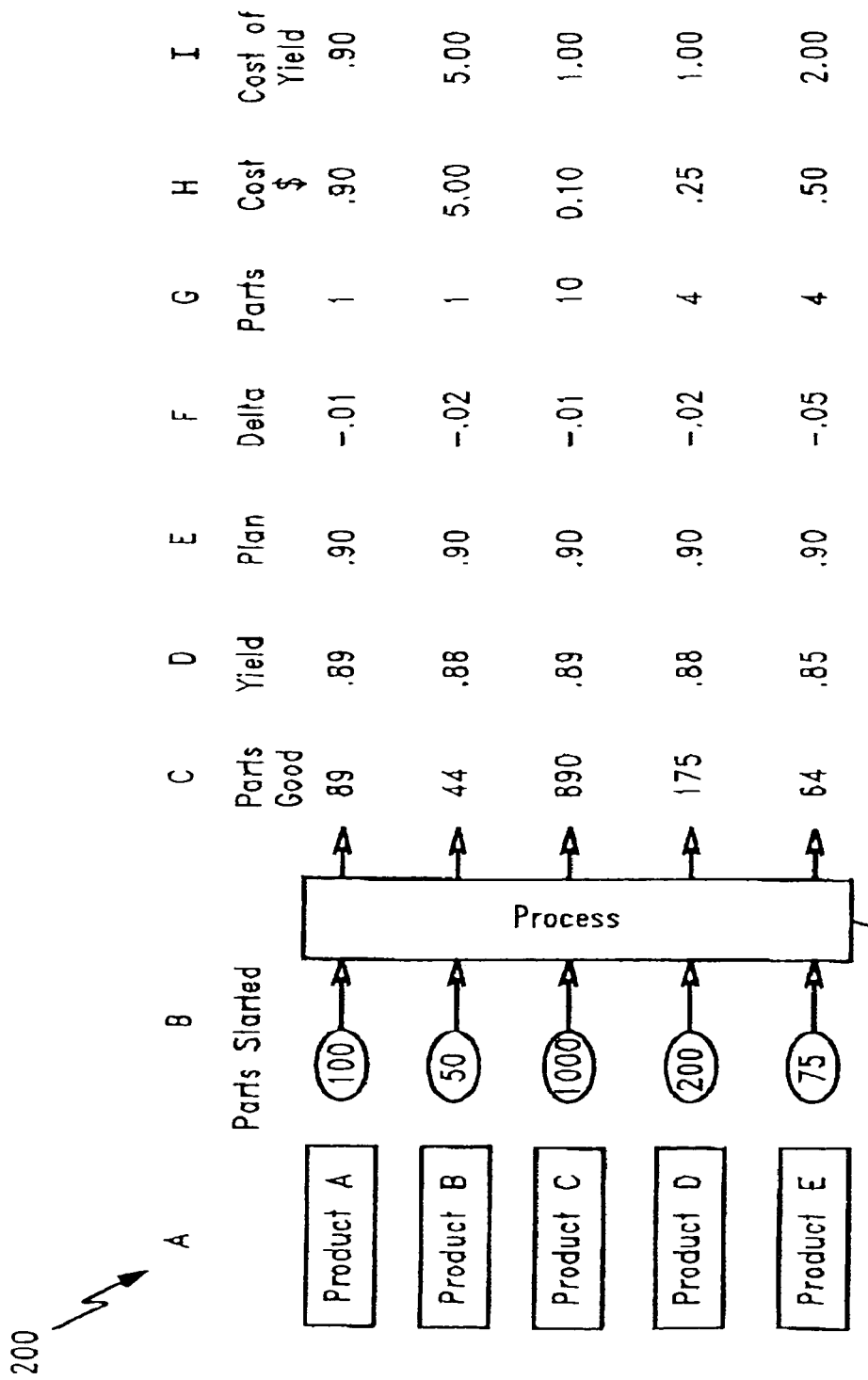
FIG. 3 is the sample chart of FIG. 2 with cost of yield measurements as calculated in a preferred embodiment of the present invention.
Figure 5:
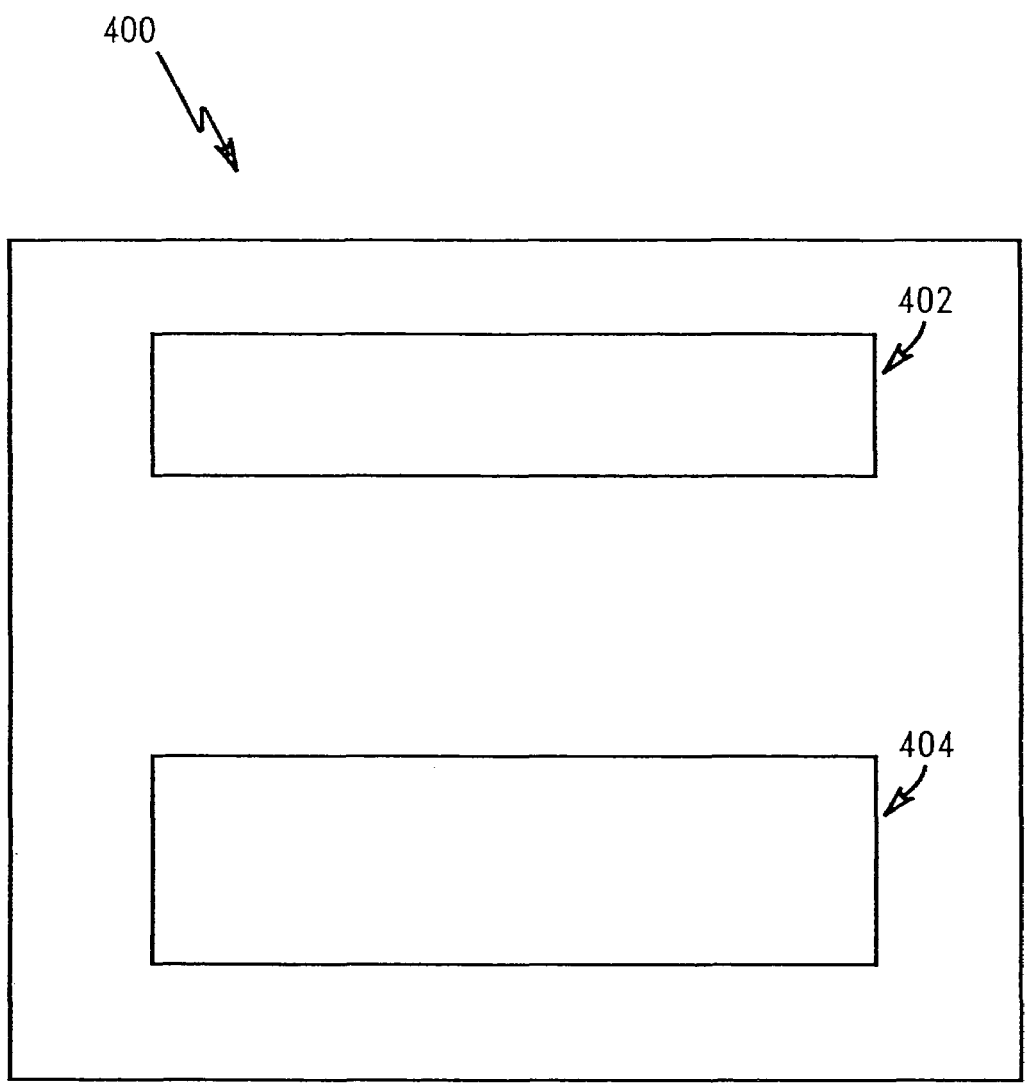
FIG. 5 is a schematic of a computer for running a computer program embodying the method of the present invention.

Referring to FIGS. 2 and 3, embodiments are shown of charts depicting the benefits of the present invention. The chart shown in FIG. 2 displays a yield management chart 100 before implementing cost of yield measurements. Column "A" lists the five products "A–E" which processes will be monitored. Column "B" indicates for each product how many parts are started, beginning with product "A" having 100 parts, and ending with product "E" starting with 75 parts. Then, all the parts are processed 102, going through their individual processing in the production plant. Next, column "C" shows the amount of parts that have been processed and are still good, starting with product "A" having 89 good parts, and ending with product "E" having 64 good parts. Column "D" shows the yield of each product and column "E" shows the expected yield or the plan for what yield would be acceptable. Column "F" shows the difference of the expected yield verses the actual yield shown in columns "D" and "E".

Concluding from the chart 100, the product "E" with a delta difference of −0.05 is the largest delta. This largest difference between the expected yield and the actual yield, from this analysis, would result in the company spending more resources on this product to try to increase the efficiency and increase its yield.

However, referring to FIG. 3, a chart 200 shows tabulation of yield management after implementing a cost of yield measurement of the present invention as explained herein. The chart 200 has a column "A" showing five products "A–E". Column "B" shows how many parts are started for each product. Then each product is processed 202. Column "C" shows how many parts are good or approved after their processing. Column "D" depicts the yield for each product "A–E". Column "E" discloses the planned yield or expected yield for each product, in this case 90% for all. Column "F" discloses the difference between the actual yield and the expected yield, shown in columns "D" and "E" respectively. Column "G" shows the parts delta, which is the amount of parts that were rejected for each process. Column "H" depicts the cost of each of those products. Column "I" gives the cost of yield in dollars which shows the number of parts multiplied by their dollar value to give a total cost for the total number of parts that are rejected for each process.

As can be seen, referring to FIGS. 2 and 3, the cost of yield is very different from the lowest yield product. The lowest yield product calculation does not show how much value that product possesses. Where value is the total cost of the product's delta between yield "D" and plan "E". Whereas, in FIG. 3, the chart 200 shows the products costing the business the most money may not be the lowest yielding products. Thus, even though product "B" has a higher yield (0.88), than product "E" (0.85), product "B" has a higher loss in dollars, at $5.00 than product "E" at, $2.00. Thus, the company using these calculations would concentrate resources on the production lines "B" and "D" since these are costing the company the most money in lost yield, and improving the yield for these products adds the most value in dollars to the company's profit.

Referring to FIG. 4, an output chart is shown which is preferably created using a software program which extracts "starts", "goods", "unit costs", and "expected yield" data from a relational database to compute a "cost of yield". The software program creates reports of the computed cost of yield for each product. The preferred reports are a summary of all products and their cost of yield for all processes. A sample report is shown in FIG. 4. The chart 300 includes one line for each product 302, and one column (C–G) for each process. There is a summary column at the far right "H" which sums the cost of yield for a given product across all processes. The report 300 is typically sorted with the poorest performing product at the top, which makes it easy to see what product needs resources the most. The summary of all products and their cost of yield for a single process step allows easy viewing of which products are performing poorest.

Referring to FIG. 4, column "A", "report class" is a product classification. There are two main material types used to make products which are organized in the report by the material type. Column "B", "product" is the name of each product. Costs and yields are tracked by each product. Each product has it's own line in the report. Column "C", "PI Cost" is the net cost of yield (in dollars) for the PI processing portion of the manufacturing process. The PI process is broken down into five major processes, each one with its own yield target by product. The "PI Cost" is the difference between the plan and actual yield for the product through PI processing, times the number of parts started into the PI process, times the unit cost of each piece. The result of the calculation is a dollar amount (either positive or negative). Column "D", "PII Cost" is the net cost of yield (in dollars) for the PII processing portion of the manufacturing process. The costs are expressed in dollars, using the yields, starts, and unit costs associated with the PII portion of the manufacturing process. Column "E", "PIII Cost" is the net cost of yield (in dollars) for the PIII processing portion of the manufacturing process. The costs are expressed in dollars, using the yields, starts, and unit costs associated with the PIII portion of the manufacturing process. Columns "F" and "G", "PIV Cost" and "PV Cost", both are net costs of yield (in dollars) for their respective portions of the manufacturing process. Column "H", "Total Cost" is the sum of the five major manufacturing process costs described above. Each line has the total for the particular product on that line. At the bottom of the report is a total across all products in the report.

The method of the present invention may be embodied as a computer program product stored on a program storage device. This program storage device may be devised, made and used as a component of a machine utilizing optics, magnetic properties and/or electronics to perform the method steps of the present invention. Program storage devices include, but are not limited to, magnetic disks or diskettes, magnetic tapes, optical disks, Read Only Memory (ROM), floppy disks, semiconductor chips and the like. A computer readable program code means in known source code may be employed to convert the methods described below for use on a computer. The computer program or software incorporating the process steps and instructions described further below may be stored in any conventional computer, for example, that shown in FIG. 4. Computer 400 incorporates a program storage device 402 and a microprocessor 404. Installed on the program storage device 402 is the program code incorporating the method of the present invention, as well as any database information for the mask pattern of a feature to be created on the semiconductor substrate and the lithographic process window variations.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A method for controlling production or manufacturing costs by obtaining measurements of unit manufacturing for a multiplicity of products or production lines and having a started units number for a plurality of processes, comprising the steps of:
   determining an approved units number for said plurality of processes;
   determining a unit production cost for each said unit in said plurality of processes;
   calculating an unapproved units number for each said process;
   calculating a cost of yield measurement for each of said plurality of processes by multiplying said unapproved units number by said unit production cost for said each said unit; and
   comparing said cost for each unapproved unit for each said process.

2. The method of claim 1 further comprising the steps of:
   providing an expected yield measurement for each of said plurality of processes;
   calculating an expected approved units number by multiplying said started units number by said expected yield measurement;
   calculating an actual yield for each of said plurality of processes;
   providing a comparison of said cost of yield with said actual yield for each said plurality of processes.

3. A method for controlling production or manufacturing costs by obtaining yield measurements of unit manufacturing for a multiplicity of products or production lines having a plurality of processes, comprising the steps of:
   determining a started units number for said plurality of processes;
   determining a cost per unit for each said unit of said plurality of processes;
   calculating an expected approved units number for said plurality of processes by multiplying said started units number by an expected yield measurement;
   calculating an actual approved units number for each of said plurality of processes by multiplying said started units number by an actual yield measurement;
   calculating an unapproved units number for each of said plurality of processes by subtracting said expected approved units number from said actual approved units number;
   calculating cost of yield measurements for said plurality of processes by multiplying said unapproved units number by said cost per unit; and
   providing a comparison of said cost of yield measurements for said plurality of processes.

4. The method of claim 3 further comprising the steps of:
   calculating an actual yield measurement by dividing an initial approved units number by said started units number for each of said plurality of processes;
   providing a comparison of said actual yield measurement for said plurality of processes;
   calculating an expected yield measurement by dividing an initial expected approved units number by said started units number for each of said plurality of processes; and
   providing a comparison of said expected yield measurement for said plurality of processes.

5. A method for controlling and improving production or manufacturing costs by obtaining yield measurements of unit manufacturing for a multiplicity of products or production lines having a plurality of processes, comprising the steps of:
   determining an initial started units number for said plurality of processes;
   determining a cost per unit number for each said unit of said plurality of processes;
   calculating an actual yield measurement by dividing an initial approved units number by said initial started units number for each of said plurality of processes;
   providing a comparison of said actual yield measurement for said plurality of processes;

calculating expected yield measurements by dividing an expected approved units number by said initial started units number for each of said plurality of processes;

providing a comparison of said expected yield measurements for said plurality of processes;

calculating an initial actual approved units number for said plurality of processes by multiplying a subsequent started units number by said actual yield measurement;

calculating subsequent expected approved units numbers for said plurality of processes by multiplying said subsequent started units numbers by said expected yield measurement;

calculating cost of yield measurements for said plurality of processes by multiplying said subsequent expected approved units number by said cost per unit; and providing a comparison of said cost of yield measurements for a plurality of processes.

6. The method of claim 5 further comprising the step of:
calculating a subsequent actual unapproved units number for a plurality of processes by subtracting said subsequent expected approved units number from a subsequent actual approved units number.

7. The method of claim 5 wherein said yields are recalculated with subsequent data and tabulated for comparing said yields.

8. The method of claim 5 wherein said plurality of processes run simultaneously.

9. The method of claim 5 further comprising the step of:
applying resources to said processes having the highest cost of yield based on said comparing of said costs of yield measurements.

10. A method for controlling production or manufacturing costs by obtaining and comparing measurements of unit manufacturing costs for production or manufacturing of a plurality of products or production lines, comprising the steps of:
determining a started units number for each of a plurality of processes;
determining an approved units number for each of said plurality of processes;
determining a unit production cost for each said unit of each said process;
calculating an unapproved units number by subtracting said units started number from said approved units number;
calculating cost of yield measurement for each of said plurality of processes by multiplying said unapproved units number by said unit production cost for each of said plurality of processes; and
providing a comparison of said cost of yield measurement for each of said plurality of processes.

11. The method of claim 10 further comprising the steps of:
calculating an actual yield measurement by dividing said approved units number by said started units number for each of said plurality of processes; and
providing a comparison of said actual yield measurement of each of said plurality of processes.

12. The method of claim 10 further comprising the steps of:
calculating a target yield measurement; and
providing a comparison of said target yield measurement for each of said plurality of processes.

13. The method of claim 10 wherein said yields are recalculated with subsequent data and tabulated for comparing said yields.

14. The method of claim 10 wherein said plurality of processes run simultaneously.

15. The method of claim 10 further comprising the step of:
applying resources to said processes having the highest cost of yield based on said comparing of said costs of yield measurements.

16. A method for controlling and improving production or manufacturing costs by obtaining and comparing yield measurements of unit manufacturing for a plurality of products or production lines comprising the steps of:
determining a started units number for each of a plurality of processes;
determining an approved units number for each of said plurality of processes;
determining a unit production cost for each said unit of each said process;
calculating an actual yield measurement by dividing said approved units number by said started units number for each of said plurality of processes;
providing a comparison of said actual yield measurements for each of said plurality of processes;
calculating a number of unapproved units by subtracting said started units number from said approved units number;
calculating cost of yield measurement for each of said plurality of processes by multiplying said number of unapproved units by said unit production cost for each unit; and
providing a comparison of said cost of yield measurement for each of said plurality of processes.

17. The method of claim 16 further comprising the steps of:
calculating an expected approved units number by multiplying said started units number by an expected yield measurement; and
calculating said approved units number by multiplying said started units number by said actual yield measurement.

18. The method of claim 17 further comprising the steps of:
calculating an expected yield measurement by dividing said expected approved units number by said started units number; and
providing a comparison of said expected yield measurements for each of said plurality of processes.

19. The method of claim 16 further comprising:
determining a sale cost of each said unit for each said process;
calculating cost of lost sales for each of said plurality of processes by multiplying said number of unapproved units by said sale cost for each unit;
providing a comparison of said cost of lost sales for each of said plurality of processes.

20. A computer program product for controlling production or manufacturing costs by obtaining measurements of unit manufacturing for a multiplicity of products or production lines and having a started units number for a plurality of processes, said computer program product having:
computer readable program code means for determining an approved units number for said plurality of processes;
computer readable program code means for determining a unit production cost for each said unit in said plurality of processes;
computer readable program code means for calculating an unapproved units number for each said process;

computer readable program code means for calculating a cost of yield measurement for each of said plurality of processes by multiplying said unapproved units number by said unit production cost for said each said unit; and computer readable program code means for comparing said cost for each unapproved unit for each said process.

21. A program storage device readable by a machine, tangibly embodying a program of instructions executable by the machine to perform steps for controlling production or manufacturing costs by obtaining measurements of unit manufacturing for a multiplicity of products or production lines and having a started units number for a plurality of, said method steps comprising:

determining an approved units number for said plurality of processes;

determining a unit production cost for each said unit in said plurality of processes;

calculating an unapproved units number for each said process;

calculating a cost of yield measurement for each of said plurality of processes by multiplying said unapproved units number by said unit production cost for said each said unit; and comparing said cost for each unapproved unit for each said process.

* * * * *